(12) United States Patent
Homier et al.

(10) Patent No.: US 12,347,058 B2
(45) Date of Patent: *Jul. 1, 2025

(54) ELEMENT ALIGNMENT FOR HANGERS IN COMPUTER-AIDED DESIGN

(71) Applicant: EVOLVE MEP, LLC, Atlanta, GA (US)

(72) Inventors: Paul Anthony Homier, Ball Ground, GA (US); Adam Heon, Atlanta, GA (US)

(73) Assignee: Evolve MEP, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,380

(22) Filed: Mar. 4, 2024

(65) Prior Publication Data

US 2024/0212303 A1 Jun. 27, 2024

Related U.S. Application Data

(63) Continuation of application No. 17/461,781, filed on Aug. 30, 2021, now Pat. No. 11,922,592, which is a continuation of application No. 17/003,935, filed on Aug. 26, 2020, now Pat. No. 11,107,295.

(60) Provisional application No. 62/891,778, filed on Aug. 26, 2019.

(51) Int. Cl.
G06T 19/20 (2011.01)
G06F 3/04815 (2022.01)
G06F 3/0482 (2013.01)

(52) U.S. Cl.
CPC .......... *G06T 19/20* (2013.01); *G06F 3/04815* (2013.01); *G06F 3/0482* (2013.01); *G06T 2200/24* (2013.01); *G06T 2219/2004* (2013.01)

(58) Field of Classification Search
CPC ... G06F 3/04815; G06F 3/0482; G06T 19/20; G06T 2200/24; G06T 2219/2004
See application file for complete search history.

(56) References Cited

U.S. PATENT DOCUMENTS

| | | | |
|---|---|---|---|
| 6,597,382 | B1 | 7/2003 | Charles |
| 6,701,288 | B1 | 3/2004 | Normann |
| 6,799,608 | B1 | 10/2004 | Koshika |
| 2004/0143470 | A1 | 7/2004 | Myrick |
| 2008/0309678 | A1 | 12/2008 | Reghetti |

(Continued)

*Primary Examiner* — Sing-Wai Wu
(74) *Attorney, Agent, or Firm* — Clayton, McKay & Bailey, PC

(57) ABSTRACT

Examples herein describe systems and methods for aligning elements, such as conduit, ductwork, and plumbing within a computer-aided design ("CAD") application. A plugin can provide an element alignment option on a graphical user interface ("GUI") of the CAD program. An anchor point from which to align elements is selected in the GUI so that the plugin can choose locations within a structure to run multiple elements in parallel alignment. The system can recommend an alignment plane based on the slopes of the selected multiple elements and provide a direction for a run of the multiple elements. The systems retrieve the specifications and parameters of each individual element to determine its spacing among the run of multiple elements. The run of multiple elements is displayed and manipulated by the plugin via the GUI.

20 Claims, 11 Drawing Sheets

(56) References Cited

U.S. PATENT DOCUMENTS

2010/0088031 A1\* 4/2010 Nielsen ................ G06Q 10/06
702/5

\* cited by examiner

ELEMENT ALIGNMENT FOR HANGERS IN COMPUTER-AIDED DESIGN

CROSS-REFERENCE TO RELATED APPLICATIONS

This continuation application claims priority to prior continuation application Ser. No. 17/461,781, filed Aug. 30, 2021, which claims priority to non-provisional application Ser. No. 17/003,935, filed Aug. 26, 2020, which claims priority to provisional application No. 62/891,778, titled "Element Alignment for Hangers in Computer-Aided Design," filed Aug. 26, 2019, which is incorporated by reference in its entirety.

BACKGROUND

Computer-aided design ("CAD") software allows users to design structures for construction, among other things. One type of CAD software is Building Information Modeling ("BIM") software, which allows users to elaborately design three-dimensional structures. AUTODESK REVIT is one type of BIM software that can be used to design complex buildings all the way down to components and assemblies for use in a project. For example, a user can model an entire plumbing or electrical installation within a building.

BIM software such as REVIT allows the user to visually layout pipe, heating ventilation & air conditioning ("HVAC") ductwork, or electrical conduit inside of building plans. However, spacing these items and aligning them on a hanger is painstaking and not practical. For one, it is difficult to see if the elements are aligned. In addition, different elements have different spacing requirements. The user needs the elements to sit on a hanger for the user to accurately translate the design into real-world parts that can be ordered and installed at a jobsite. Hangers are an important part of laying out air conditioning ducts or pipe. Existing software does not include any means of accurately laying out the elements on hangers, much less any determinations as to whether a potential layout would work or be up to code. However, users are largely stuck with using REVIT and other already available CAD programs because of their ubiquitous adoption within the industry.

BIM software often includes templates for conduit and other construction assemblies, allowing the designer to lay out conduit in the plan. REVIT templates for conduit and other components, such as plumbing or air conditioning ducts, can allow a user to draw a long run and easily visualize where the components will go. But simply drawing out the runs for conduit, pipe, and ductwork may not take into consideration code requirements for spacing electrical separate from plumbing or ductwork separate from electrical, among others Because of these limitations on current CAD and BIM technology, much time is spent in the field determining how to hang conduit, pipe, or ducts based on other elements of the building. Sometimes a run of pipe or ducts must be rerouted, which can require reordering parts when the specific lengths and bends of the CAD-generated pipe or duct assembly no longer will suffice. Alternatively, the on-site construction can leave placement of ducts, pipe, and conduit completely up to field workers, who might place conduits too close to plumbing or ducts to close to plumbing such that it does not properly meet building codes.

Therefore, a need exists for a system that can resolve conduit, pipe, and duct work placement accurately and automatically within a BIM system, including within current BIM systems such as REVIT that do not natively provide this functionality.

SUMMARY

The examples described herein specifically address technical problems and limitations of REVIT and similar BIM software. The examples include a computing device, such as a personal computer, tablet, or laptop, that executes a computer-aided design application such as REVIT. The application can include an application programming interface ("API") that interacts with a plugin that supplies additional functionality for spacing elements on the GUI in a way that is up to code and that actually aligns the elements on an edge, such as a hanger. The plugin can include a spacing engine that executes on the computing device. The plugin can also utilize a spacing table to determine how much space to put between elements.

Examples described herein include systems and methods for conduit, pipe, and ductwork placement in a CAD program, such as REVIT. The CAD program can execute with a plugin that includes functionality for spacing, code applications, and collision detection in an example. The plugin can utilize conduit, pipe, and ductwork parameters stored in a database to determine how to align conduit, pipe, and ductwork runs to comply with building codes and to avoid collisions.

In one example, a system can provide an option in a graphical user interface ("GUI") to align conduit. The system for aligning conduit placement is provided via a computer-aided design ("CAD") application. The CAD program can generate the GUI and the GUI can receive inputs from a user. The system also incorporates a database for storing conduit alignment parameters. The conduit alignment parameters can include conduit dimensions; local building and zoning codes related to conduit; conduit spacing requirements; gap requirements; fitting requirements; fitting dimensions; and the like. Similar information may be stored in the database for plumbing alignment parameters and HVAC alignment parameters. The system incorporates a processor for executing instructions to perform stages. These stages include receiving a first selection of an anchor element via the GUI. The anchor element can be one of a pipe, conduit, or ductwork. In another stage, the system receives a second selection, via the GUI, of multiple elements to align with the anchor element. The plugin, via the GUI, can visually align the multiple elements based on the anchor element and an edge. The visual alignment includes defining an alignment plane based on the edge element. The anchor element is then aligned with multiple elements in the alignment plane. The processing automatically provides spacing between the multiple elements and the anchor element is a reference point for the spacing.

The alignment plane can be specified on the GUI to align vertically, horizontally, or along a specified plane. The horizontal alignment of the selected multiple elements can set parallel, center-to-center, from the selected anchor point. In a further example, fittings associated with the multiple elements are selected, via the GUI, and the processor retrieves specifications for the fittings from the database. These fittings are then displayed as a component of the multiple elements and the processor determines the spacing requirements of the fittings based upon parameters retrieved form the database. The multiple elements are then spaced and aligned based upon the inclusion of the fittings attached to the multiple elements. The processor determines the horizontal and vertical alignment of the selected multiple elements based upon the parameters of the selected multiple elements, their fittings, and the parameters of the anchor point. The system can recommend an alignment plane based on the slopes of the selected multiple elements and provide a direction for a run of the multiple elements. In a further example, the plugin can incorporate a determined buffer into the horizontal spacing configuration for the selected multiple elements and the anchor point. In still a further example, vertical alignment of the selected multiple elements relative to the anchor point is determined by gravity.

In another example, a method for aligning element placement is provided via a CAD application. The CAD application generates the GUI and the GUI receives inputs from a user. In the method, a database for stores element alignment parameters. The element alignment parameters can include elemental dimensions; local building and zoning codes related to the elements; element spacing requirements; gap requirements; fitting requirements; fitting dimensions; and the like. Similar information may be stored in the database for plumbing alignment parameters, wiring parameters, and HVAC alignment parameters. The method incorporates a processor for executing instructions to perform stages. These stages include receiving a first selection of an anchor element via the GUI. The anchor element can be one of a pipe, conduit, wiring, or ductwork. In another stage, the method receives a second selection, via the GUI, of multiple elements to align with the anchor element. The processor, via the GUI, can visually align the multiple elements based on the anchor element and an edge. The visual alignment includes defining an alignment plane based on the edge element. The anchor element is then aligned with multiple elements in the alignment plane. The processing automatically provides spacing between the multiple elements and the anchor element is a reference point for the spacing.

Both the foregoing general description and the following detailed descriptions are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example, an option is provided within a CAD or BIM program, such as REVIT, to align elements for certain object types, such as conduit, ducts, or pipes, which are to be mounted on a structure. A plugin can provide a button for running this functionality within a GUI where a design layout is displayed. The design layout can include multiple parts and assemblies within, for example, a floor plan. It can be used to layout objects for a construction project, for example.

The plugin can align elements for example in a model presented onscreen. The parameters for these elements are stored in a database. However, before merely placing the elements, the plugin can also check for collisions, adjust spacing, and account for fittings where necessary.

Figure 1:
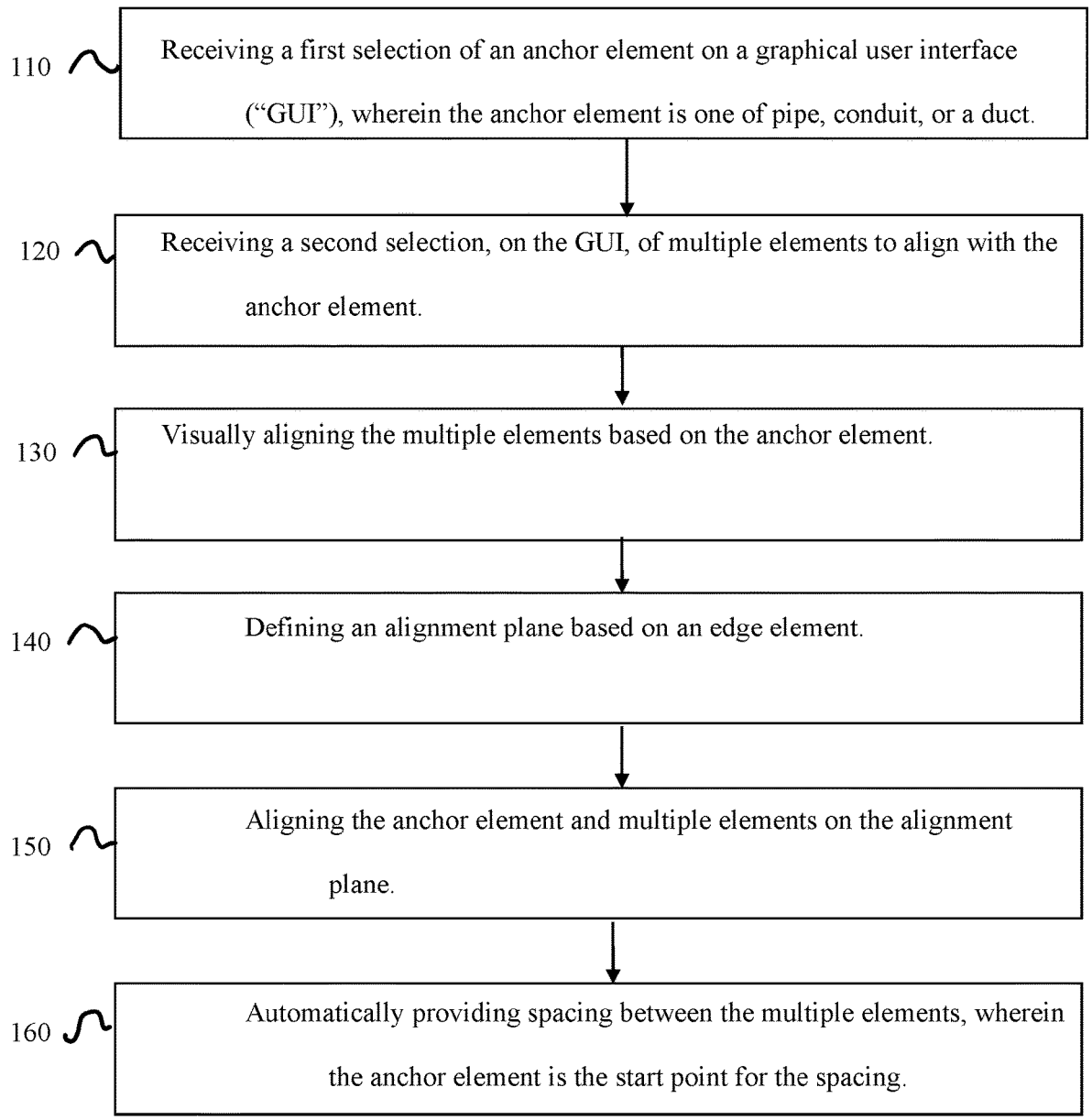
FIG. 1 is an example flow chart for a method of aligning elements on hangers within a CAD application.

FIG. 1 is an example flowchart for aligning elements in a CAD application, such as REVIT. A plugin can cause REVIT to perform multiple stages that normally are not available within REVIT. For example, a button can be presented on the GUI for aligning multiple parallel elements.

At stage 110, the GUI can receive a first selection of an anchor element. This can be in response to selecting the alignment button. For example, the plugin can then cause the GUI to display a prompt to select the anchor element by clicking on an element to which the other elements will align. The anchor element can be selected by the user, and can be one of a pipe, conduit, or a duct.

The plugin can make an API call to the application (e.g., REVIT) to retrieve a slope of the selected anchor element. The slope can be three dimensional in nature. This slope can be stored by the plugin for use in aligning the other elements.

The GUI can also prompt the user to select which elements will be aligned and receive that selection at stage 120. This can happen before or after stage 110, depending on the example. For instance, the user can begin by selecting multiple elements at stage 120 and then click the button to align those elements, causing stage 110 to occur after stage 120. In that example, stage 110 can be limited to anchor elements that are part of the selection of stage 120. In either case, stage 120 can involve selecting multiple elements to align with the anchor element, such as by drawing a selection box around the elements or clicking the elements one at a time to add to a selected collection.

The selected multiple elements need not have the same slope as the anchor element in an example. However, the plugin can attempt to trim the selection to multiple elements of a same type, such as conduit or pipe, in an example. This can ensure that other elements in the selection that do not actually need alignment can be ignored. In that example, the plugin can create an array of selected elements and then use API calls to return the element type for each element. The element types can be, for example, conduit, plumbing, or ductwork. Based on the most prevalent the element type, the plugin can automatically reduce the selection to the multiple elements that have that prevalent element type. Alternatively, the plugin can cause the GUI to present a prompt to the user for confirming that this reduction should occur. In one example, selected elements that are not elongated or have no slope orientation can be automatically omitted by the plugin.

At stage 130, the plugin can then visually align the multiple elements on the GUI based on the anchor element. This can include the stages 140, 150, and 160, in an example. The alignment can include changing a slope dimension to match a dimension of the slope of the anchor element in an example. The coordinates of the elements can also be changed to align with the anchor element along an alignment plane in an example.

In one example, the GUI prompts the user to identify an alignment plane. This can include asking the user whether to align the elements horizontally (X or Y), vertically (Z), or both. This selection can determine which dimensions of the slope and coordinates change for the selected elements, relative to those of the anchor element. Retrieving and setting slopes and coordinates of any of the elements on the GUI can be performed by the plugin through API calls to the CAD application.

At stage 140, the plugin can define the alignment fully or partially based on an edge element that the user selects. The user can be prompted to select or decline selection of the edge element as a third selection in addition to those at stages 110 and 120. For example, the user can select a hanger element as the edge element, providing an "edge" where the selected elements and anchor element will be aligned. Alternatively, the user can select the anchor element as the edge element. This can cause the other elements to be brought into the same alignment plane as the anchor element, whereas selecting a different edge element can cause all of the elements to rest along that edge withing the same alignment plane.

The slope of the alignment plane can be specified by the user, as noted above. For example, a prompt can allow the user to select between horizontal, vertical (i.e., elevation), or both. In one example, the user can also select to align to the top or bottom of the edge element. Alternatively, the GUI can allow the user to specify the alignment to follow the anchor element (e.g., conduit), such that the slope of the alignment plane is the same as the anchor element relative to ground and the anchor element lies within the alignment plane.

In another example, the alignment plane can be determined in part by the user drawing a plane within the GUI. This can include creating a rectangle at the desired angle, in an example. This can form the alignment slope. The alignment plane can then be virtually placed at the rectangle or moved to the selected edge element while maintaining the same alignment slope.

In one example, the user can select to not move the anchor element, making the anchor element also the edge element. This can be useful, for example, when no hanger exists yet in the REVIT model. A user can then have the other elements align with the edge element on an alignment plane based on gravity direction (e.g., bottom elevation) or some other user-defined alignment plane.

In another example, the alignment plane can be recommended based on determining like slopes of the multiple elements. For example, the plugin can determine that the slopes of like element types within the selection are within a threshold, such as 5%, from one another. Based on that determination, the most common shared slope can be used for forming the alignment plane. If no slopes are shared within the threshold deviation, then the median slope can be used.

At stage 150, the plugin can cause the GUI to align the anchor element and multiple selected elements on the alignment plane. This can include bringing the elongated elements to rest on the alignment plane while also making them parallel to the anchor element. To do this, the plugin can loop through each selected element and provide an API command to change slope and location coordinates of the element. For example, each element can have an element ID that is retrieved as part of selecting the element. Then the API command can include rotate or slope commands for that element ID. Another API command can set coordinates for the element ID. The coordinates can include at least two dimensions that are the same as the alignment plane, in an example. This means that, based on alignment settings, the element will be moved or rotated such that it is parallel with the alignment plane or anchor element.

At stage 160, which can occur separately or as part of stage 150, the plugin can automatically provide spacing between the multiple selected elements. The anchor element can act as the start point for the spacing. In this way, the anchor element can remain stationary (or snapped to an edge) while the other elements are moved to be spaced from the anchor element. In one example, the spacing can occur along one of the dimensions of the alignment plane. The spacing can be dictated by alignment settings in an example. Spacing rules can be specific to element type and can include spacing from center-to-center or edge-to-edge between adjacent elements. For example, different element types such as conduit and pipe can have different spacing requirements. In addition, elements of the same type but with different diameters or those made from different materials can also have different spacing requirements. The spacing can also include rounding to a specified fraction of measurement unit and can include an additional pad or gap to ensure appropriate spacing in an example. Padding can add a buffer to spacing values, in an example.

In one example, parallel portions of the can be moved while maintaining connection to bends. For connected pieces, the API command can cause movement in a direction until the turn contacts the plane that the parallel portion has moved on. At that point, the GUI can shirk or grow the parallel piece such that the parallel piece still reaches and forms a turn, remaining in contact with the connected piece.

This method can result in, for example, spacing conduit or pipe with just a few selections and clicks. These selected elements can be spaced in parallel to an anchor element along an edge element, such as a hanger. The process can change the slopes of the selected elements relative to the ground, a wall, or some other drawn-in plane. This can allow a user to easily manipulate elements withing REVIT to bring them into alignment in a way that conforms with code, rather than having to painstakingly place each element.

Figure 2A:
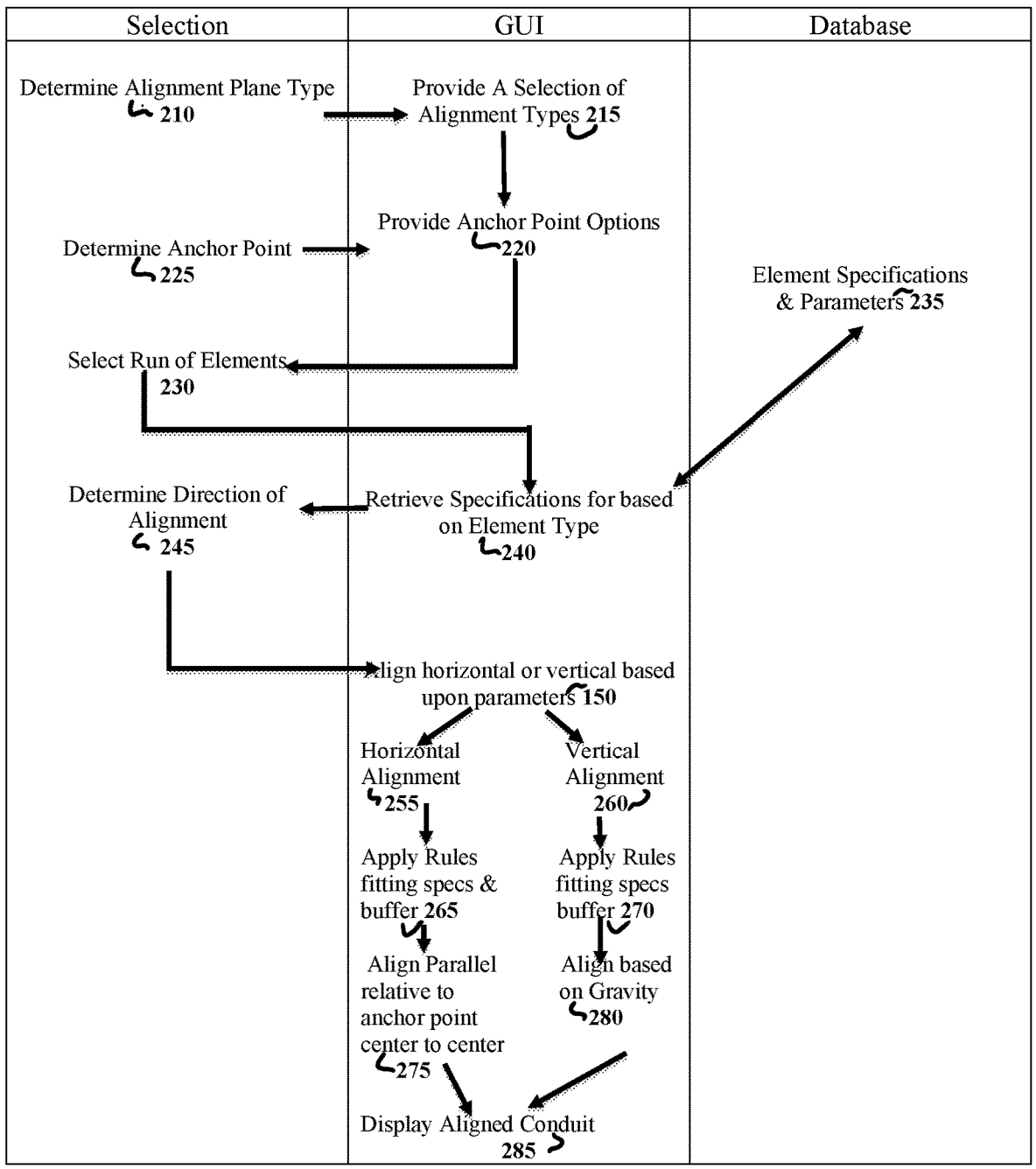
FIG. 2A is a sequence diagram of example steps for element alignment.

FIG. 2A is an example sequence diagram for alignment of elements for a hanger. At stage 210, a plugin can execute as part of a BIM program, such as REVIT, to provide an option on a GUI to align elements by first determining an alignment type. This can include providing a button on the GUI or a drop-down menu item. The GUI can provide a selection of alignment types 215. The alignment types can be horizontal, vertical, or both. The button can cause the system to determine a direction for aligning elements on a selected structure in accordance with the parameters of the elements.

At stage 220, the plugin can use the GUI to provide a number of anchor point options. The anchor point options can be an existing plane or element, such as pipe, conduit, or another structure. The plugin can also provide, within the GUI, the option for selecting an edge element, which can be a structure such as a hanger or a user-defined plane. The plugin can also recommend via the GUI an anchor element based on the element parameters. The GUI allows the user to select and determine the anchor element, such as by clicking the element, in an example.

At stage 230, a number of elements can be presented in the GUI. The user can select one or more of these elements to model a run of elements within a structure. The GUI allows the user to select one or a plurality of elements for a modeled run.

Furthermore, at stage 240, the plugin can retrieve parameters and specifications of each of the selected elements in the selected run of elements from a database of element specifications and parameters. The element specifications and parameters can allow the plugin to calculate spacing requirement for each element in the selected run of elements. For example, different element types such as conduit and pipe can have different spacing requirements. In addition, elements of the same type but with different diameters or those made from different materials can also have different spacing requirements. These parameters and spacing requirements can include fittings and other components associated with the selected run of elements.

For adjacent elements, the controlling spacing can be the greater value of the adjacent elements. For example, if two elements have different spacing and pad values, the greater of those values can be used. The pad can be added to the spacing to determine where to set the coordinate of the first element relative to the adjacent second element.

Once the selected run of elements 230 and their respective parameters and specifications have been determined, the plugin can then determine the direction of alignment of the selected run of elements within the structure. The selected run of elements can be aligned horizontally, vertically, or at some other user-defined slope. The alignment spacing can be based upon the parameters of the elements. At stage 255, if the run of elements is aligned horizontally, the plugin applies rules related to fittings, specifications, and buffer requirements 265 of the selected run of elements 230. The plugin can align the elements in parallel relative to the anchor point, wherein the runs of elements 230 are aligned center to center. For example, when a first element is the anchor point, the adjacent second element can receive the full adjustment to move it to the correct distance from the first element. Then a third element on adjacent to the second element can be spaced in the same direction from the second element, and so on until all of the multiple selected elements have been spaced out according to the parameters.

The GUI then displays the run of elements in the GUI with their new locations and orientations.

At stage 260, if the run of elements 230 are to be aligned vertically, the plugin can apply similar rules for spacing, fittings, and buffers 270. The run of elements is then aligned with respect to the direction of gravity or to a specified vertical alignment plane. Once the run of elements is aligned, the plugin displays the run of elements in the GUI.

Figure 2B:
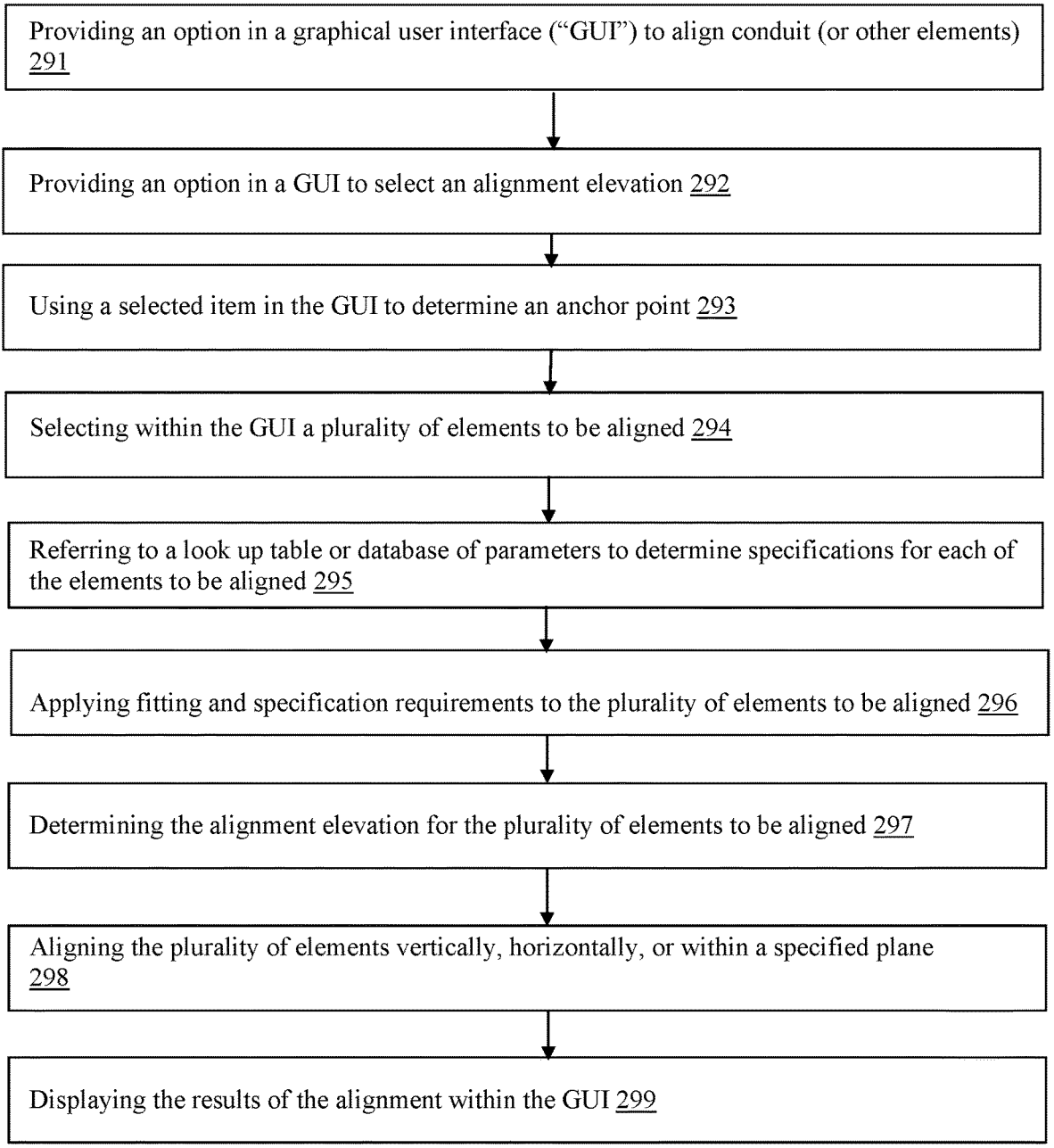
FIG. 2B is a flowchart of an example method for performing element alignment in a BIM software environment.

FIG. 2B is a flow chart depicting an example of the various stages of a conduit alignment process. While the steps in FIG. 2B focus on conduit, the elements aligned could also be wiring, pipes, duct work, plumbing, and the like. Beginning at stage 291, the plugin can provide an option in the GUI to align elements, such as conduit, plumbing, or ductwork within a structure. These elements for alignment may already exist within a modeled structure shown in the GUI.

At stage 292, the plugin can present to a user, via the GUI, an option to select an alignment elevation. This can impact an automatically generated alignment plane. The elements can be aligned horizontally, vertically, or to an edge. The plugin may further align the elements based on elevation, spacing, or both.

The GUI can display various elements within the structure of the building that is being modeled. At stage 293, the user then has the option at stage 293 of choosing an anchor point.

The selection of an anchor point at stage 293 in effect can allow the user to choose an element that will not be moved (along at least one direction relative to the movement of other elements). The anchor element can be any kind of conduit, pipe, plumbing, HVAC ductwork, or other elongated object. The shape can be any cylinder, tube, square, or rectangular box, depending on the example. The plugin can also allow for the selection of an edge element that the anchor element and other selected elements will snap to. The edge element can be a trapeze hanger, pillar, wall, or other piece of the structure.

Once the anchor point (and optionally the edge) has been selected, the plugin, via the GUI, allows for the selection of the run of elements to be automatically aligned in stage 294. In on example, the user selects a plurality of elements 240 that require alignment for a conduit run, pipe run, duct run, etc. Within the selected plurality of elements 240, each of the elements can be the same size or different sizes, such as different widths or circumferences. The selected plurality of elements 240 can be aligned center to center on a horizontal axis.

The plugin is able to determine the spacing of the selected plurality of elements by referring to a look up table and/or a database of parameters to determine specification for each of the elements to be aligned in stage 295. The parameters that are stored in the lookup table and/or database include parameters that are specific to each individual element. The parameters associated with the selected plurality of elements can include dimensions, spacing requirements, building codes, fitting requirements, tolerances, and the like.

The information gathered at stage 295 related to each individual element of the selected plurality of elements is used by the plugin at stage 296 to calculate and determine the individual spacing requirements of each element. At stage 296, the plugin applies the fitting and specification requirements for each individual element of the plurality of elements to be aligned. Fittings can include adapters, gaskets, joints, valves, and the like. Fittings can alter the spacing requirements of various elements within a selected run of elements 240. Similar to stage 295, the plugin can look up the specifications and parameters for each individual fitting from the lookup table or database.

At stage 297, once the plugin has the specifications and parameters for each individual element and associated fitting, the selected plurality of elements the plugin must determine the orientation of the run of elements. Therefore, the plugin determines the alignment elevation for the selected plurality of elements. This selected plurality of elements can be aligned horizontally, vertically, or to an edge element. If the selected plurality of elements is to be aligned vertically, the anchor element may not be needed. Instead, the run of the selected plurality of elements is run with respect to gravity. If the selected plurality of elements is to be aligned horizontally, the anchor element is needed.

Having the specification and parameter associated with the selected plurality of elements, the plugin can allow the plurality of elements to automatically be aligned vertically, horizontally, or with respect to a selected edge element at stage 298. The aligned run of the selected plurality of elements are aligned in parallel. The plugin can also determine which slopes are the same for a selected plurality of elements and recommend an alignment plane that is compatible with that slope. The plugin can further determine the direction of the selected plurality of elements. For vertically aligned selected plurality of elements, the alignment is based on gravity or specified alignment plane. If an elevation is not specified, the selected plurality of elements is aligned along a bottom elevation. Existing, connected runs of elements are moved in the direction of the selected plurality of elements unless a barrier is encountered. The connected runs of elements can shrink or grow relative to the aligned selected plurality of elements.

Once the selected plurality of elements has been aligned, the GUI automatically displays the aligned selected plurality of elements. The plugin provides dynamic display and adjustment of the aligned selected plurality of elements.

Figure 3A:
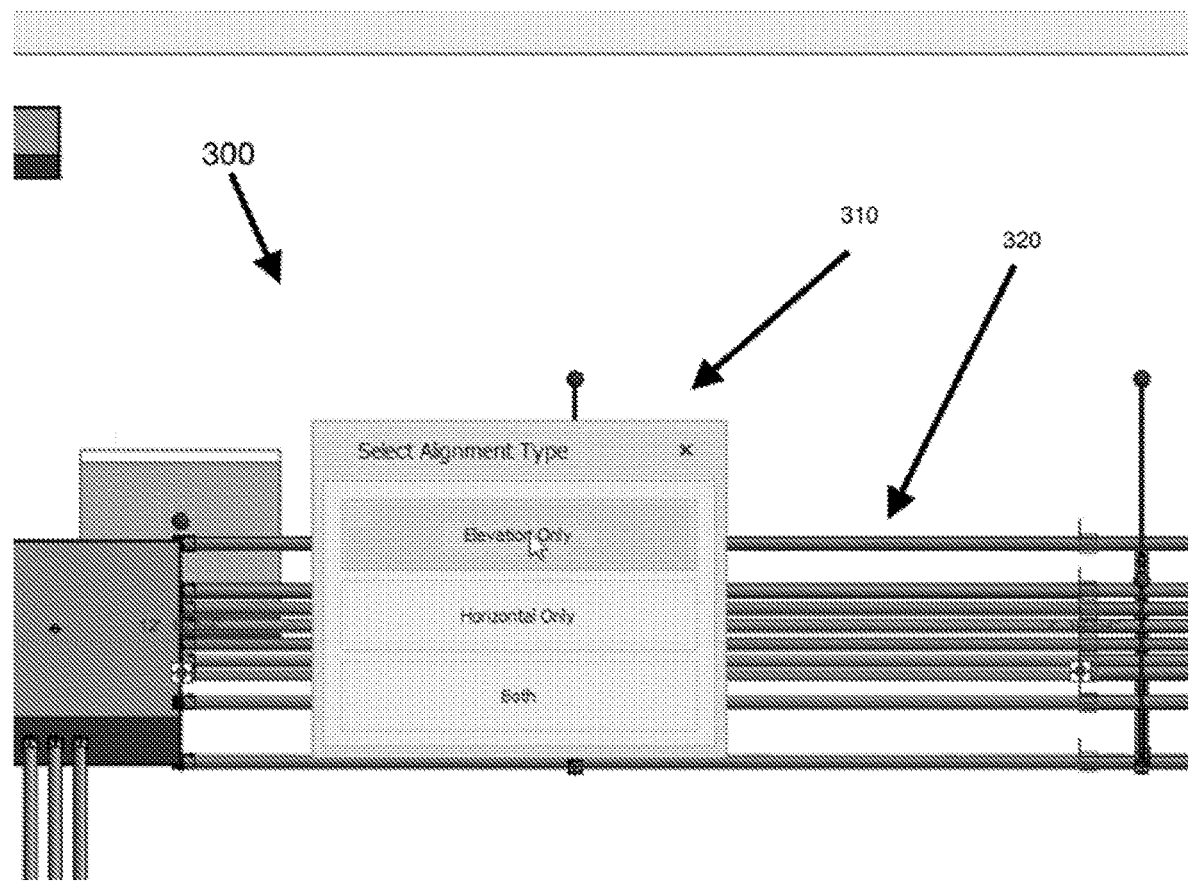
FIG. 3A is an example illustration of a GUI screen for aligning hanger elements.

Turning now to FIG. 3A, an illustration of the GUI 300 for use with the plugin is illustrated. The GUI 300 can present a user with an option to select an alignment elevation 310. The various runs of elements can be presented to the user via the GUI. The GUI 300 allows the user to adjust the point of view of the model. Each individual element has a specific set of parameters and specification that are available for review. The elements can be aligned horizontally, vertically, or to an edge. The plugin may further align the elements based on elevation, spacing, or both.

Once the elevation has been selected, the plugin via the GUI displays various elements within the structure of the building that is being modeled. The user then has the option of choosing an anchor point. The selection of an anchor point can indicate which element should not move so that the other selected elements can be moved in relation to that stationary element. The element can be any kind of conduit, pipe, plumbing, HVAC ductwork, etc. The shape can be a cylinder, tube, square, rectangular box, etc. The selected anchor point can also be the edge of a trapeze hanger, pillar, wall, or other piece of the structure.

Figure 3B:
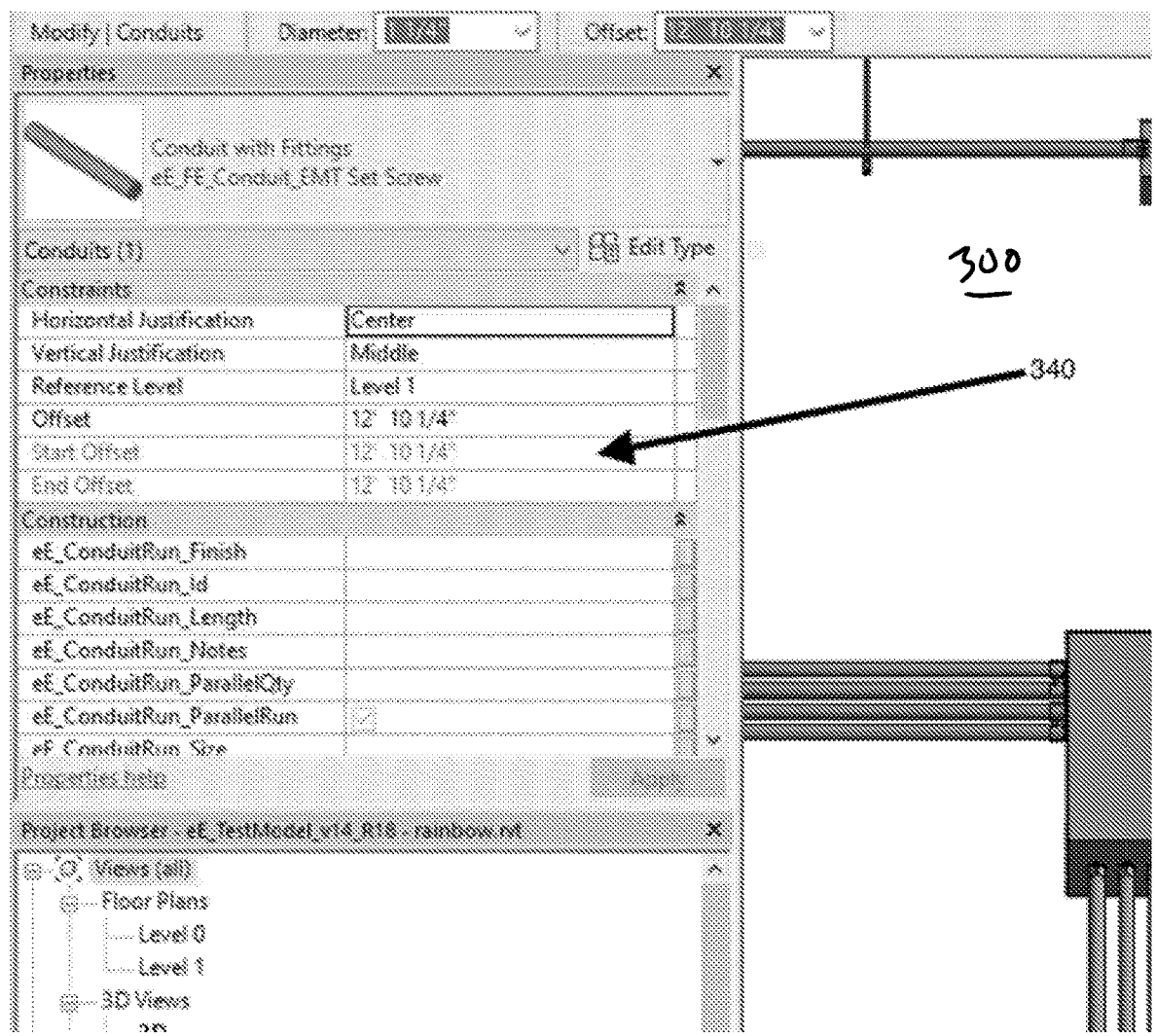
FIG. 3B is an example illustration of a GUI screen for aligning hanger elements.

FIG. 3B shows another portion of the GUI 300 where the user can set parameters 340 for the selected elements. These parameters can include spacings and offsets, which can be dictated by either user preference or code. These spacings and offsets can be used by the plugin to in automatically aligning elements in hangers.

Figure 3C:
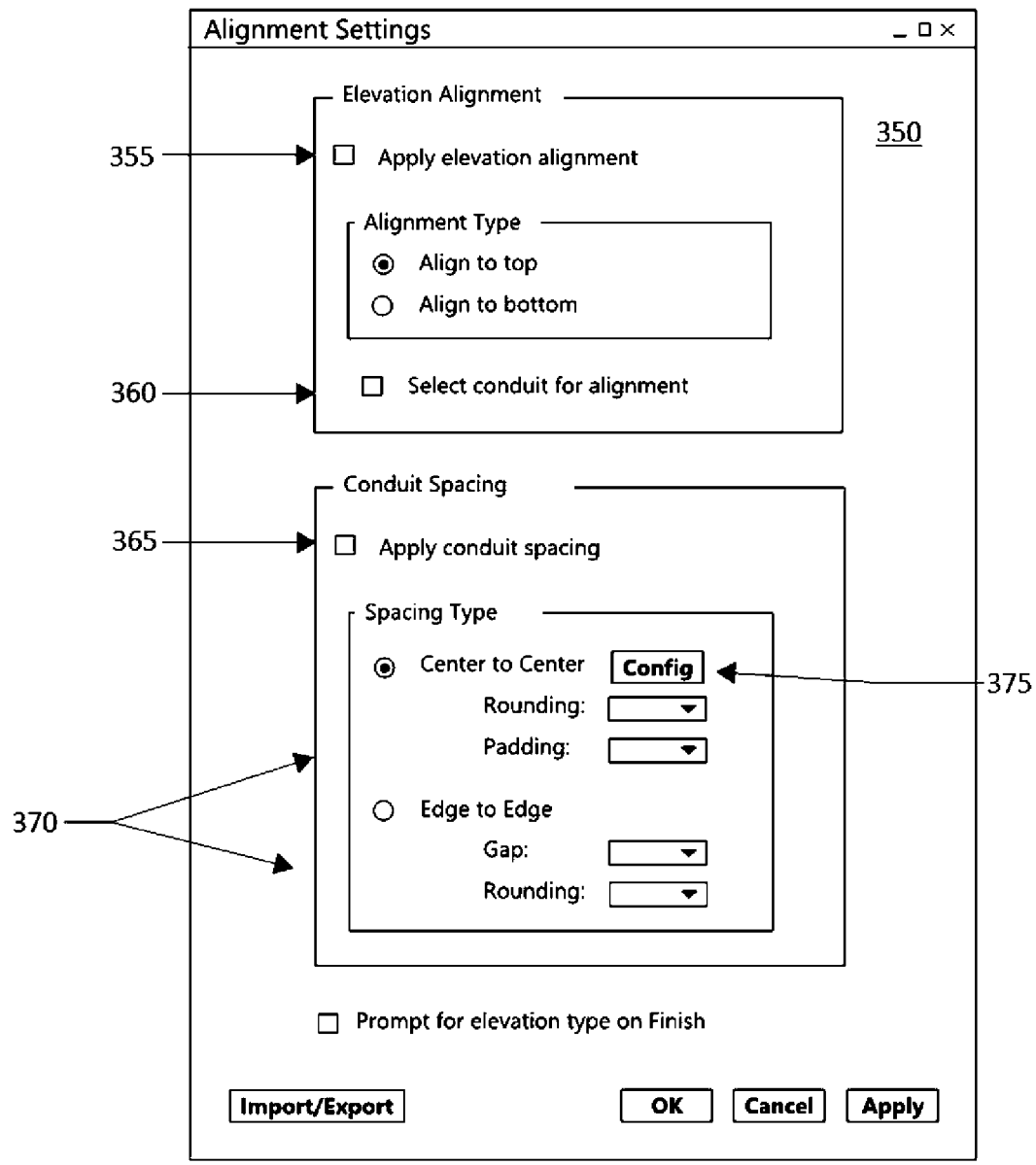
FIG. 3C is an example illustration of a GUI pane for alignment settings.

FIG. 3C is an example illustration of a GUI pane 350 for alignment settings. These settings can be used by the plugin to automate alignment of the selected elements. For example, an elevation alignment options 355, 360 can allow a user to specify how to align elements. Option 355 can activate or deactivate elevation alignment settings. When activated, option 360 can specify whether or not the selected elements should be aligned to an anchor element, such as conduit, or to a specified edge. For example, when option 360 is unchecked, the plugin will attempt to align objects to an edge. An alignment type can specify aligning to the top or bottom of an edge in an example.

Element (e.g., conduit) spacing settings can also be provided. For example, an option 365 to apply conduit spacing can cause the plugin to use particular spacing values and techniques when aligning the selected elements. This can include spacing type options 370. In this example, center-to-center and edge-to-edge are provided as spacing measurements for adjacent elements. Different settings for rounding, padding (addition to spacing) or gap (distance between edges) can be applied. A configuration button 375 can allow a user to modify spacing tables for element types, in an example.

Additionally, alignment types such as elevation only, spacing only, or both, can be provided.

Figure 4:
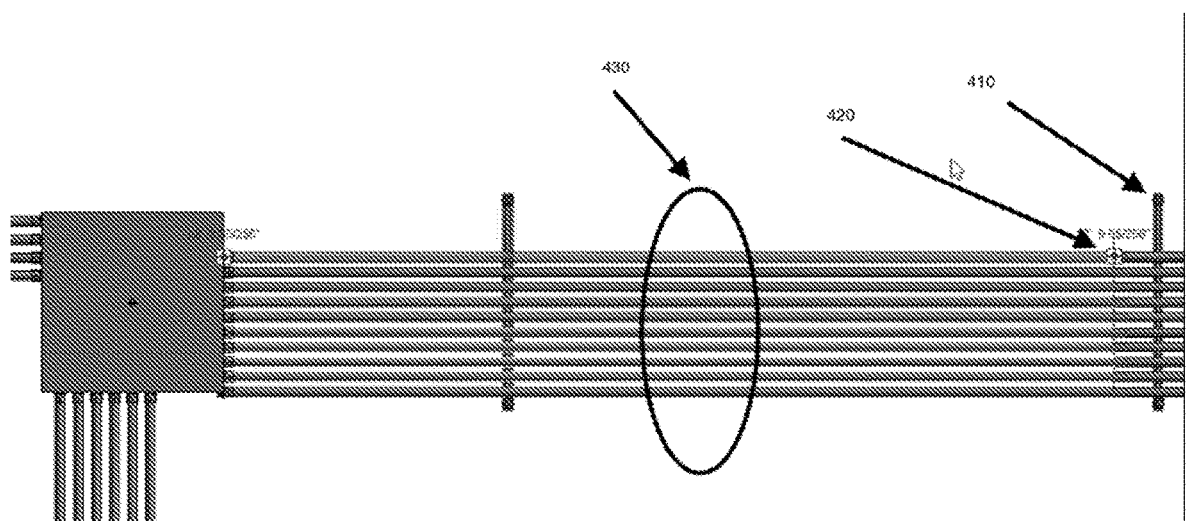
FIG. 4 is an example illustration of a GUI screen for aligning hanger elements.

FIG. 4 is an example illustration of a GUI screen for aligning hanger elements. In FIG. 4, the plugin, via the GUI, allows an anchor point 420 to be selected. The plugin, via the GUI, also allows for the selection of the run of elements 430 to be automatically aligned. The user can select a plurality of elements 430 that require alignment for a conduit run, pipe run, duct run, etc.

Figure 5:
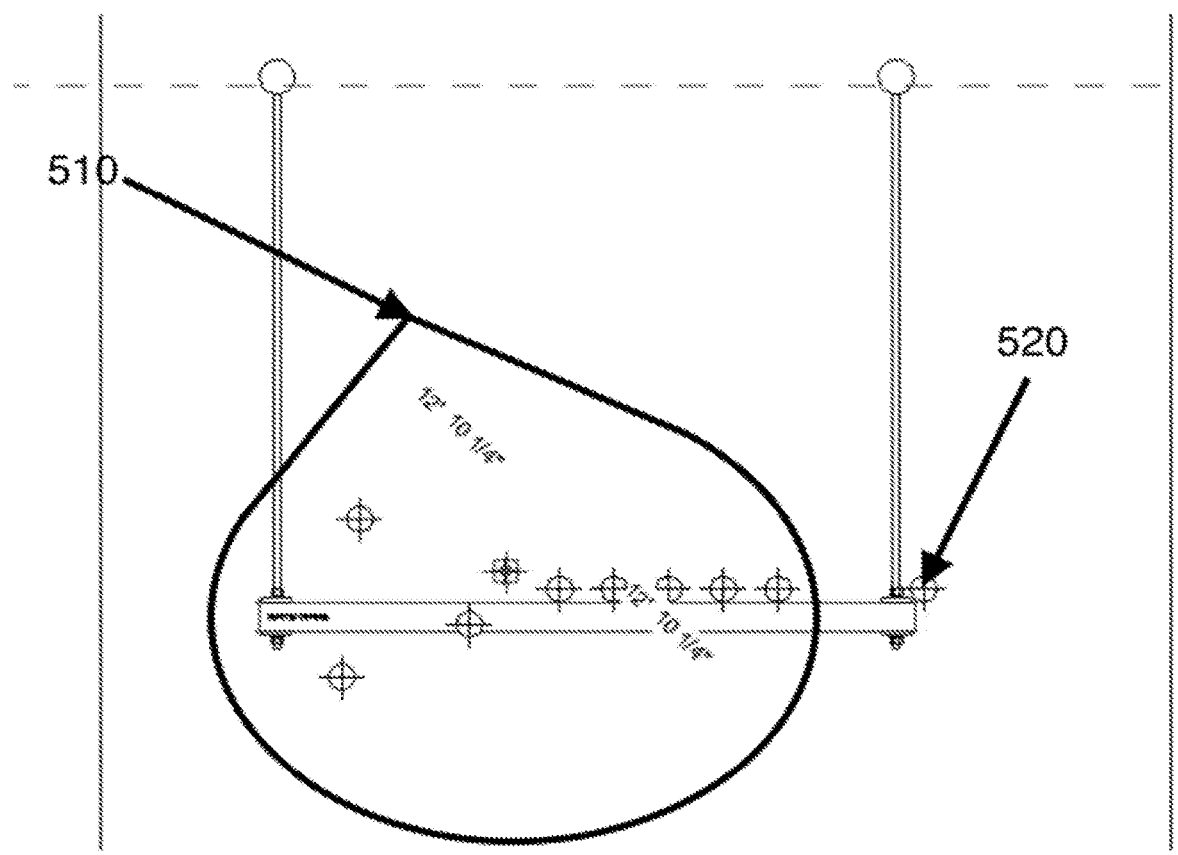
FIG. 5 is an example illustration of a GUI screen for aligning hanger elements.

FIG. 5 is an example illustration of a GUI screen for aligning hanger elements. FIG. 5 illustrates a selection of a plurality of elements 510 and an anchor point 520. The selected plurality of elements 510 can be aligned to an anchor point 520. Note the plurality of elements 510 can be of different shapes, sizes, and orientations.

With the selected plurality of elements 510 to be aligned and the anchor point 520, 620 selected, the plugin can gather the specifications of each individual element.

Figure 6:
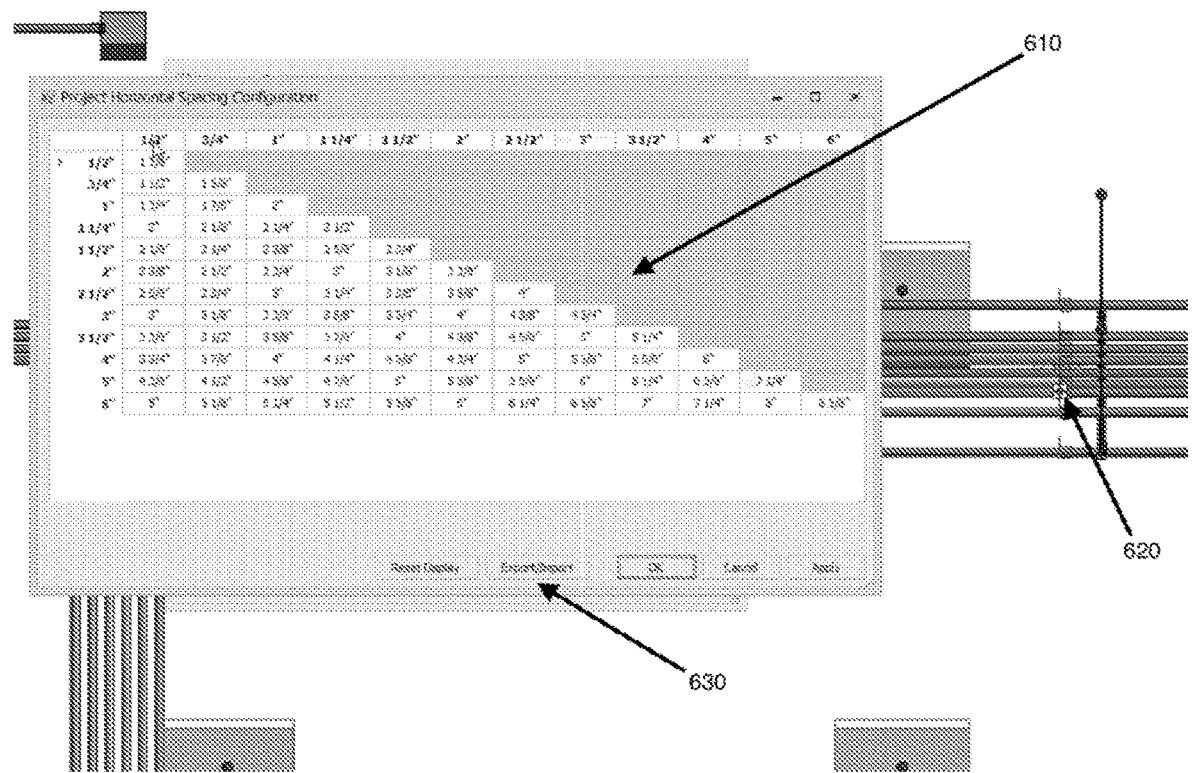
FIG. 6 is an example illustration of a GUI screen for aligning hanger elements.

FIG. 6 is an example illustration of a GUI screen for aligning hanger elements. In FIG. 6, the plugin references a database and/or look up table 610 to gather parameters and specifications for each element, such as those of FIG. 3B. The table 610 can be one example of a spacing table. The spacing table can be two dimensional and track spacing values between element types with different widths, diameters, and/or material configurations. In this example, the spacing table has columns and rows that are assigned to different width or diameter measurements. The intersecting cell can represent the spacing between adjacent elements having the width or diameter of the respective row and column.

The spacing table can define spacing for different element sizes, with elements having different diameters also having different spacing rules. The padding setting can cause additional spacing to be added to the spacing defined in the spacing table, and a rounding setting can cause a final spacing to be rounded to a nearest measurement. The plugin can also import or export additional databases and lookup tables 610 when new or different elements 510 are being aligned.

Figure 7:
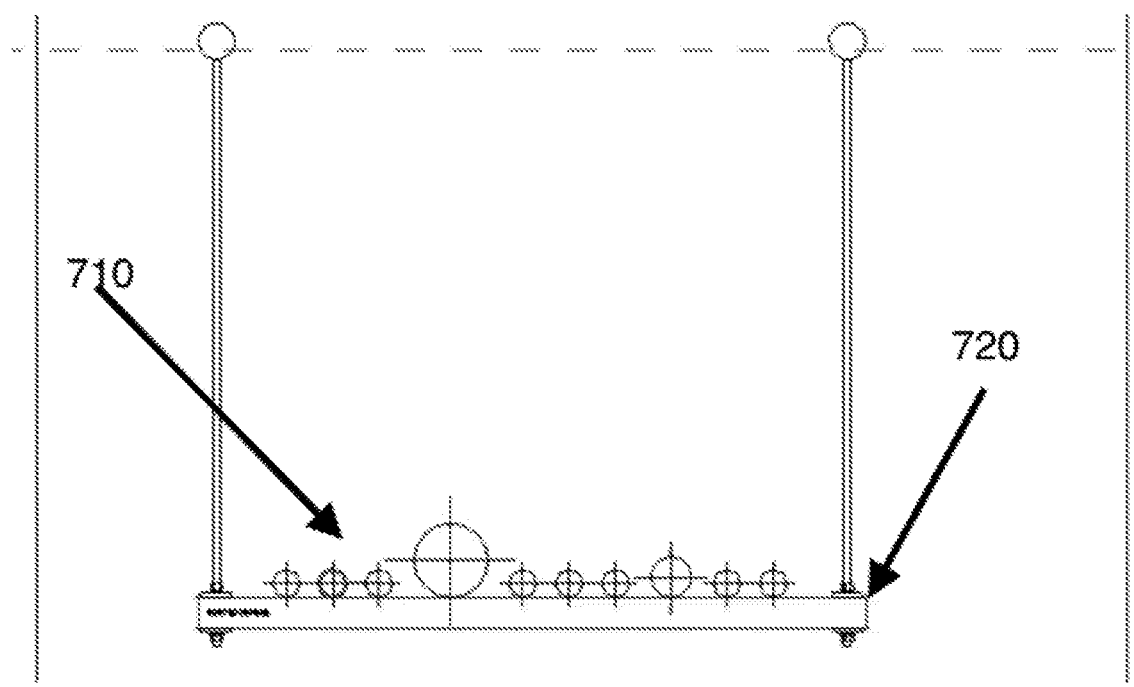
FIG. 7 is an example illustration of a GUI screen for aligning hanger elements.

FIG. 7 is an example illustration of a GUI screen for aligning hanger elements. FIG. 7 illustrates the output of the plugin in an example. Once the parameters and specifications have been applied for each element 640, the selected plurality of elements 710 are aligned to an anchor point 720. The plugin allows the aligned selected plurality of elements 710 to be rotated and viewed from various angles.

Figure 8:
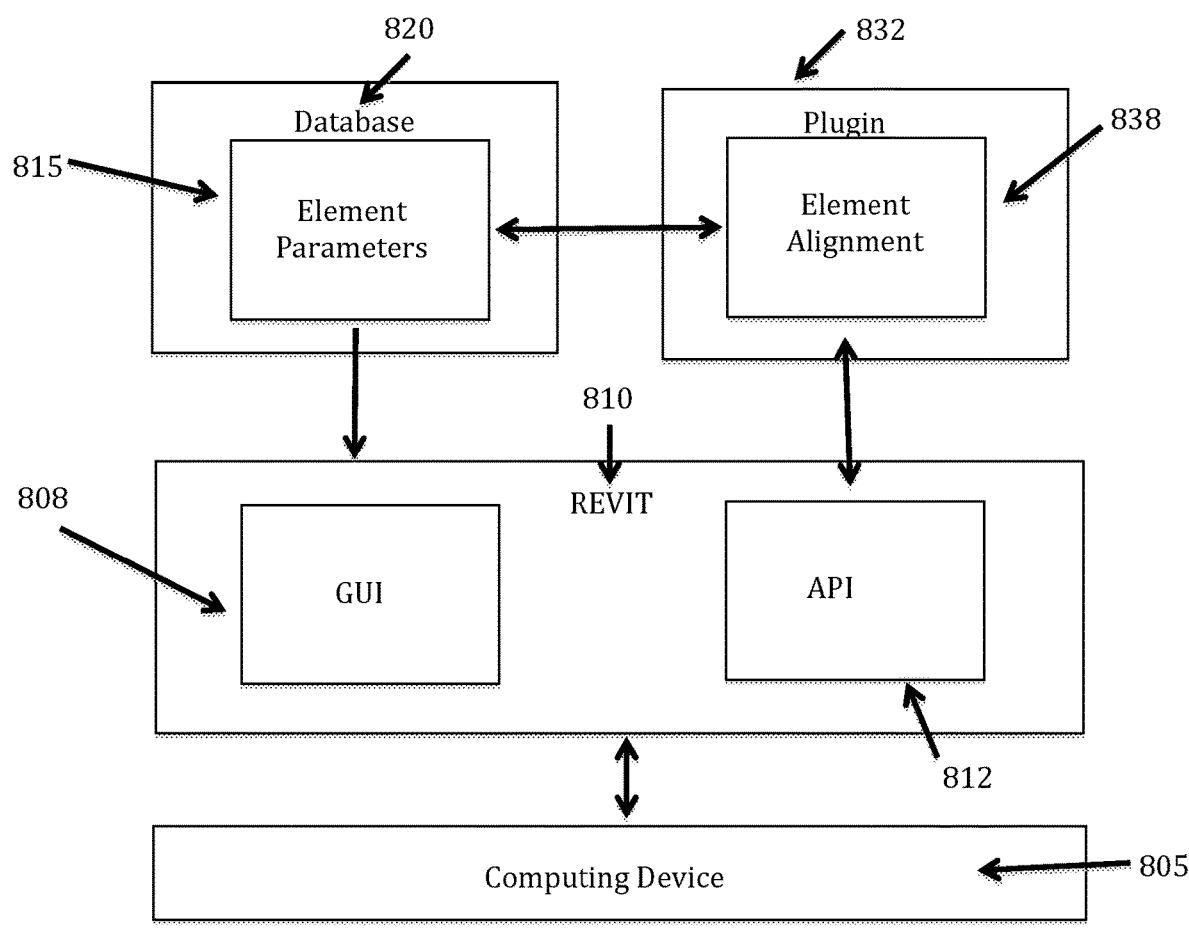
FIG. 8 is an example system diagram including example components for automatic alignment of runs of elements on hangers in a CAD environment.

FIG. 8 includes an exemplary diagram of a system 800 in accordance with an example. REVIT 810 or another BIM program can execute on a computing device 805. The BIM program, such as REVIT 810, includes a GUI 808 used to create and display a design layout. Using REVIT 800, designers can create models of nearly any type of physical object, including dwellings and other structures. In one example, electrical, plumbing, or HVAC assemblies can also be designed. Although REVIT 810 is used as an example, the disclosure applies to other BIM or CAD programs as well.

The computing device 805 can be any processor-based device, such as a personal computer, laptop, tablet, or cell phone. It can also include or be part of a server in one example. The computing device 805 can display the REVIT 810 GUI 808 by executing a set of instructions stored locally or remotely on a computer-readable medium. The computing device 805 can also execute the plugin 832 in one example. In another example, the plugin 832 can be an application that executes remotely on a server that is accessed by the computing device 805. The plugin 832 can be executed as part of REVIT 810 or another CAD or BIM application.

The plugin 832 can improve the GUI 808 of REVIT 810 or another BIM application. For example, the plugin 832 can allow the REVIT 810 GUI 808 to display options and screens for automatically providing alignment of a run of elements. For example, the GUI 808 can display screens for selecting a run of a plurality of elements to align. The user can modify these on the GUI 808. The user can also select an anchor or reference point to which, the plurality of elements can be aligned.

In one example, a database 820 stores the element parameters 815. The element parameters 815 can be imported and exported into different REVIT 808 projects in one example. The element parameters 815 can ensure proper element alignment and spacing based on different specifications, shapes, and sizes. For example, the element parameters 815 can account for part lengths, widths, bends, and connector information.

Any type of computing device can implement the database 820. In one example, the database 820 is part of computing device 805. In another example, the database 820 is remotely accessible by the computing device 805, such as over a network. The network can be a local area network, an enterprise network, or the Internet. In one example, multiple computing devices 805 in an enterprise can remotely access the database 820 over the network. This can allow for centralized storage of the element parameters 415, allowing for some administrative users to optimally set the parameters that are then available for other users to implement in projects.

Using the API, REVIT 810 can execute custom methods for the plugin 832 when certain events occur within REVIT 810. Custom methods can include new procedures that are part of plugin 832. Events are generated when an action is submitted to a REVIT 810 server for performance by REVIT 810. The plugin 832 can implement the events to cause REVIT 810 to communicate with the plugin 832. The plugin 832 then can execute custom methods for customized functionality.

Although a plugin 832 is used in a preferred example, in another example the same functionality is built into the BIM application itself. All of the examples still apply to that configuration.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for element alignment in a computer-aided design ("CAD") application, including:
   a database that stores element parameters, including element sizes and spacing requirements;
   a processor that executes instructions to perform stages comprising:
      receiving at least one selection on a graphical user interface ("GUI"), wherein the at least one selection identifies at least:
         an anchor element on the GUI, wherein the anchor element is one of pipe, conduit, or a duct; and
         multiple elements to align with the anchor element; and
      visually aligning the multiple elements based on the anchor element, wherein the visual alignment includes:
         defining an alignment plane based on an edge element or another input;
         aligning the anchor element and multiple other non-connected elements in parallel relative to one another on the alignment plane; and
         automatically providing spacing between the multiple elements, wherein the anchor element is a start point for the spacing.

2. The system of claim 1, wherein the alignment plane is based on a direction represented by gravity in combination with the edge element, wherein the edge element is separately selected by the user.

3. The system of claim 1, wherein the alignment plane is based on an alignment direction selected on the GUI in combination with the edge element.

4. The system of claim 1, wherein the alignment plane is based on a plane drawn by the user on the GUI, in combination with the edge element.

5. The system of claim 1, wherein the alignment plane is recommended based on determining like slopes of the multiple elements, and wherein the edge element is the same as the anchor element.

6. The system of claim 1, wherein the spacing between the multiple elements is based on a spacing table that defines spacing for different element sizes, wherein elements with different diameters have different spacing rules.

7. The system of claim 6, wherein a padding setting causes additional spacing to be added to the spacing defined in the spacing table, and a rounding setting causes a final spacing to be rounded to a nearest measurement.

8. The system of claim 1, wherein the at least one selection includes two rows of elements.

9. A method for aligning elements within a REVIT plan, comprising:
   receiving at least one selection on a graphical user interface ("GUI"), wherein the at least one selection identifies at least:
      an anchor element on the GUI, wherein the anchor element is one of pipe, conduit, or a duct; and
      multiple elements to align with the anchor element; and
   visually aligning the multiple elements based on the anchor element, wherein the visual alignment includes:
      defining an alignment plane based on an edge element or another input;
      aligning the anchor element and multiple other non-connected elements in parallel relative to one another on the alignment plane; and
      automatically providing spacing between the multiple elements, wherein the anchor element is a start point for the spacing.

10. The method of claim 9, wherein the alignment plane is based on a direction represented by gravity in combination with the edge element, wherein the edge element is separately selected by the user.

11. The method of claim 9, wherein the alignment plane is based on an alignment direction selected on the GUI in combination with the edge element.

12. The method of claim 9, wherein the alignment plane is based on a plane drawn by the user on the GUI, in combination with the edge element.

13. The method of claim 9, wherein the alignment plane is recommended based on determining like slopes of the multiple elements.

14. The method of claim 9, wherein the spacing between the multiple elements is based on a spacing table that defines spacing for different element sizes, wherein elements with different diameters have different spacing rules.

15. The method of claim 14, wherein a padding setting causes additional spacing to be added to the spacing defined in the spacing table, and a rounding setting causes a final spacing to be rounded to a nearest measurement.

16. A non-transitory, computer-readable medium containing instructions for aligning elements in a computer-aided design application, the instructions causing a processor to execute stages comprising:
- receiving at least one selection on a graphical user interface ("GUI"), wherein the at least one selection identifies at least:
  - an anchor element on the GUI, wherein the anchor element is one of pipe, conduit, or a duct; and
  - multiple elements to align with the anchor element; and
- visually aligning the multiple elements based on the anchor element, wherein the visual alignment includes:
  - defining an alignment plane based on an edge element or another input;
  - aligning the anchor element and multiple other non-connected elements in parallel relative to one another on the alignment plane; and
  - automatically providing spacing between the multiple elements, wherein the anchor element is a start point for the spacing.

17. The non-transitory, computer-readable medium of claim 16, wherein the alignment plane is based on a direction represented by gravity in combination with the edge element, wherein the edge element is separately selected by the user.

18. The non-transitory, computer-readable medium of claim 16, wherein the alignment plane is based on an alignment direction selected on the GUI in combination with the edge element.

19. The non-transitory, computer-readable medium of claim 16, wherein the alignment plane is based on a plane drawn by the user on the GUI, in combination with the edge element.

20. The non-transitory, computer-readable medium of claim 16, wherein the spacing between the multiple elements is based on a spacing table that defines spacing for different element sizes, wherein elements with different diameters have different spacing rules.

* * * * *